US012152905B2

(12) United States Patent
Kim et al.

(10) Patent No.: US 12,152,905 B2
(45) Date of Patent: Nov. 26, 2024

(54) METHOD FOR CALIBRATING GEOMAGNETIC SENSOR OF ELECTRONIC DEVICE AND ELECTRONIC DEVICE THEREOF

(71) Applicant: SAMSUNG ELECTRONICS CO., LTD., Suwon-si (KR)

(72) Inventors: Jinik Kim, Suwon-si (KR); Namjoon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 115 days.

(21) Appl. No.: 18/094,713

(22) Filed: Jan. 9, 2023

(65) Prior Publication Data
US 2023/0147478 A1 May 11, 2023

Related U.S. Application Data

(63) Continuation of application No. PCT/KR2021/008167, filed on Jun. 29, 2021.

(30) Foreign Application Priority Data

Jul. 9, 2020 (KR) ........................ 10-2020-0084822

(51) Int. Cl.
*G01R 35/00* (2006.01)
*G01C 17/02* (2006.01)
(Continued)

(52) U.S. Cl.
CPC ............. *G01C 25/00* (2013.01); *G01C 17/02* (2013.01); *G01C 22/00* (2013.01); *G01P 13/00* (2013.01); *G01P 15/00* (2013.01)

(58) Field of Classification Search
CPC ......... G01P 15/00; G01P 13/00; G01C 22/00; G01C 22/006; G01C 25/00; G01C 17/02;
(Continued)

(56) References Cited

U.S. PATENT DOCUMENTS 8,005,635 B2 * 8/2011 Lin ..................... G01C 25/005
701/472
8,370,097 B2 2/2013 Patel et al.
(Continued)

FOREIGN PATENT DOCUMENTS

JP      2005-345388 A    12/2005
JP   WO2009/008411 A1    1/2009
(Continued)

OTHER PUBLICATIONS

Search Report (PCT/ISA/210) issued Oct. 8, 2021 by the International Searching Authority for International Patent Application No. PCT/KR2021/008167.
(Continued)

Primary Examiner — Thang X Le
(74) Attorney, Agent, or Firm — Sughrue Mion, PLLC

(57) ABSTRACT

Disclosed is an electronic device comprising: a gyro sensor; an acceleration sensor for outputting acceleration data about motion of the electronic device; a geomagnetic sensor for outputting geomagnetic data about a magnetic field around the electronic device; and a low-power processor electrically connected to the gyro sensor, the acceleration sensor and the geomagnetic sensor. The low-power processor: operates the acceleration sensor while the gyro sensor is deactivated to determine a motion pattern of the electronic device; drives the geomagnetic sensor to acquire geomagnetic data such that, if the motion of the electronic device corresponds to a predetermined first motion pattern, the geomagnetic data is acquired at a first sample rate, and, if the motion corresponds to a predetermined second motion pattern, the geomagnetic data is acquired at a second sample rate higher than the first sample rate; and calibrates the geomagnetic sensor on the basis of the geomagnetic data.

15 Claims, 13 Drawing Sheets

(51) Int. Cl.
  *G01C 22/00* (2006.01)
  *G01C 25/00* (2006.01)
  *G01P 13/00* (2006.01)
  *G01P 15/00* (2006.01)

(58) Field of Classification Search
  CPC .......... G01C 17/28; G01C 17/38; G01V 3/08; G01V 3/38
  See application file for complete search history.

(56) References Cited

U.S. PATENT DOCUMENTS

| | | | |
|---|---|---|---|
| 8,718,938 B2* | 5/2014 | Wolf | G06F 1/3287 |
| | | | 33/355 R |
| 8,825,425 B2 | 9/2014 | Kadokura | |
| 8,825,426 B2 | 9/2014 | Chowdhary et al. | |
| 9,030,192 B2 | 5/2015 | Oliver et al. | |
| 11,519,730 B2* | 12/2022 | Villien | G01C 17/38 |
| 2009/0320305 A1 | 12/2009 | Ito et al. | |
| 2010/0312510 A1* | 12/2010 | Piemonte | G01C 17/28 |
| | | | 702/93 |
| 2011/0239026 A1 | 9/2011 | Kulik | |
| 2013/0006573 A1 | 1/2013 | Brunner et al. | |
| 2013/0218515 A1 | 8/2013 | Ashida | |
| 2014/0200841 A1 | 7/2014 | Choi et al. | |
| 2014/0365154 A1 | 12/2014 | Moore et al. | |
| 2015/0046734 A1 | 2/2015 | Kabasawa et al. | |
| 2016/0011022 A1* | 1/2016 | Zheng | G01D 18/00 |
| | | | 702/94 |
| 2019/0195907 A1 | 6/2019 | Nomura et al. | |

FOREIGN PATENT DOCUMENTS

| | | |
|---|---|---|
| JP | 2016-114569 A | 6/2016 |
| JP | 2019-113526 A | 7/2019 |
| KR | 10-2008-0107479 A | 12/2008 |
| KR | 10-2013-0002340 A | 1/2013 |
| KR | 10-2014-0043466 A | 4/2014 |
| KR | 10-2014-0093111 A | 7/2014 |
| KR | 10-2016-0002103 A | 1/2016 |
| WO | 2012/066850 A1 | 5/2012 |

OTHER PUBLICATIONS

Written Opinion (PCT/ISA/237) issued Oct. 8, 2021 by the International Searching Authority for International Patent Application No. PCT/KR2021/008167.

* cited by examiner

METHOD FOR CALIBRATING GEOMAGNETIC SENSOR OF ELECTRONIC DEVICE AND ELECTRONIC DEVICE THEREOF

CROSS-REFERENCE TO RELATED APPLICATIONS

This application is a bypass continuation application of International Patent Application PCT/KR2021/008167, filed on Jun. 29, 2021, which is based on and claims priority to Korean Patent Application No. 10-2020-0084822, filed on Jul. 9, 2020 in the Korean Intellectual Property Office, the disclosures of each of which are incorporated by reference herein in their entireties.

BACKGROUND

1. Field

The disclosure relates to a method for calibrating a geomagnetic sensor of an electronic device and the electronic device thereof, and more particularly to performance of such calibration based on detection of predetermined motion patterns corresponding to typical movement.

2. Description of Related Art

Recently, as the processing performance of electronic devices such as mobile devices and wearable devices has dramatically increased, various functions are provided, and in particular, a geomagnetic sensor for providing azimuth information is often mounted.

The geomagnetic sensor is a sensor that measures the strength of the earth's magnetic field, and is possible to measure an azimuth with a criterion of the magnetic north of the electronic device, based on geomagnetic data sensed by the geomagnetic sensor.

However, the accuracy of a geomagnetic sensor often changes depending on the surrounding environment. For example, an accuracy value of the geomagnetic sensor of the electronic device can change in a space where there is a lot of electromagnetic influence, such as an elevator or a car. Calibration is required to acquire accurate azimuth information. For example, the calibration of the geomagnetic sensor can be performed by providing a UI requesting a user to move the device in a circular or figure-eight shape in an application that uses the geomagnetic sensor.

Assuming a scenario in which an electronic device provides azimuth information to a user, after an application providing azimuth information is executed, a geomagnetic sensor must be calibrated in order to provide accurate azimuth information to the user. Therefore, an operation of moving the electronic device in a circular or figure-eight shape must precede the operation of the application, making it difficult to provide immediate azimuth information when the user desires.

Also, since the geomagnetic sensor does not have a function for actively adjusting an interval of collecting geomagnetic data, a uniform geomagnetic data collection pattern may be applied in the process of calibrating the geomagnetic sensor. This can cause a lot of current consumption.

Various embodiments disclosed in the present disclosure may provide an electronic device that immediately provides azimuth information when a user desires, and increases a user experience of an azimuth service.

SUMMARY

In accordance with certain embodiments of the present disclosure, an electronic device may include a gyro sensor, an acceleration sensor for outputting acceleration data about motion of the electronic device, a geomagnetic sensor for outputting geomagnetic data about a magnetic field around the electronic device, and a low-power processor electrically connected to the gyro sensor, the acceleration sensor and the geomagnetic sensor. The low-power processor may be configured to operate the acceleration sensor while the gyro sensor is inactivated, and to determine whether the motion of the electronic device corresponds to one of a predetermined first motion pattern and a predetermined second motion pattern, based on the acceleration data acquired by the acceleration sensor The low-power processor may be configured to drive the geomagnetic sensor to thereby acquire geomagnetic data, wherein, when the motion corresponds to the first motion pattern, the geomagnetic data is first geomagnetic data acquired at a first sample rate, and, when the motion corresponds to the second motion pattern, the geomagnetic data is second geomagnetic data acquired at a second sample rate higher than the first sample rate by driving the geomagnetic sensor. The low-power processor may be configured to calibrate the geomagnetic sensor, based on the geomagnetic data.

In accordance with other embodiments of the present disclosure, a method for calibrating a geomagnetic sensor of an electronic device of an embodiment may include operating an acceleration sensor of the electronic device while a gyro sensor of the electronic device is inactivated, and determining whether motion of the electronic device corresponds to one of a predetermined first motion pattern and a predetermined second motion pattern, based on acceleration data acquired by the acceleration sensor. The method may include driving the geomagnetic sensor to thereby acquire geomagnetic data, wherein, when the motion corresponds to the first motion pattern, the geomagnetic data is first geomagnetic data acquired at a first sample rate, and, when the motion corresponds to the second motion pattern, the geomagnetic data is second geomagnetic data acquired at a second sample rate higher than the first sample rate by driving the geomagnetic sensor. The method may include calibrating the geomagnetic sensor, based on the geomagnetic data.

In accordance with still other embodiments of the present disclosure, an electronic device may include an acceleration sensor for outputting acceleration data about the motion of the electronic device, a geomagnetic sensor for outputting geomagnetic data about a magnetic field around the electronic device, and a low-power processor electrically connected to the acceleration sensor and the geomagnetic sensor. The low-power processor may be configured to determine whether the motion of the electronic device corresponds to one of a predetermined first motion pattern and a predetermined second motion pattern, based on acceleration data acquired by the acceleration sensor. The low-power processor may be configured to compare the accuracy of the geomagnetic sensor with a preset threshold value by driving the geomagnetic sensor, when the motion corresponds to any one of the first motion pattern and the second motion pattern. The low-power processor may be configured to acquire geomagnetic data from the geomagnetic sensor when the accuracy of the geomagnetic sensor is less than the threshold value, wherein, when the motion corresponds to the first motion pattern, the geomagnetic data is first geomagnetic data acquired at a first sample rate, and, when the motion corresponds to the second motion pattern, the geomagnetic data is second geomagnetic data acquired at a second sample rate higher than the first sample rate. The low-power processor may be configured to calibrate the geomagnetic sensor, based on the geomagnetic data.

According to various embodiments disclosed in the present disclosure, a low-power processor of an electronic device may immediately present accurate azimuth information to a user without a prior operation such as the conventional figure-eight calibration, by always detecting the motion of the electronic device and calibrating a geomagnetic sensor according to a motion pattern.

According to various embodiments disclosed in the present disclosure, current consumption of an electronic device may be optimized, by determining a motion pattern of the electronic device and selectively applying a pattern of collecting geomagnetic data from a geomagnetic sensor according to the motion pattern.

Besides this, various effects identified directly or indirectly through the present disclosure may be presented.

BRIEF DESCRIPTION OF THE DRAWINGS

The above and other aspects, features, and advantages of certain embodiments of the present disclosure will be more apparent from the following description taken in conjunction with the accompanying drawings, in which identical or like reference numerals in the drawings denote identical or like elements, and wherein.

DETAILED DESCRIPTION

Figure 1A:
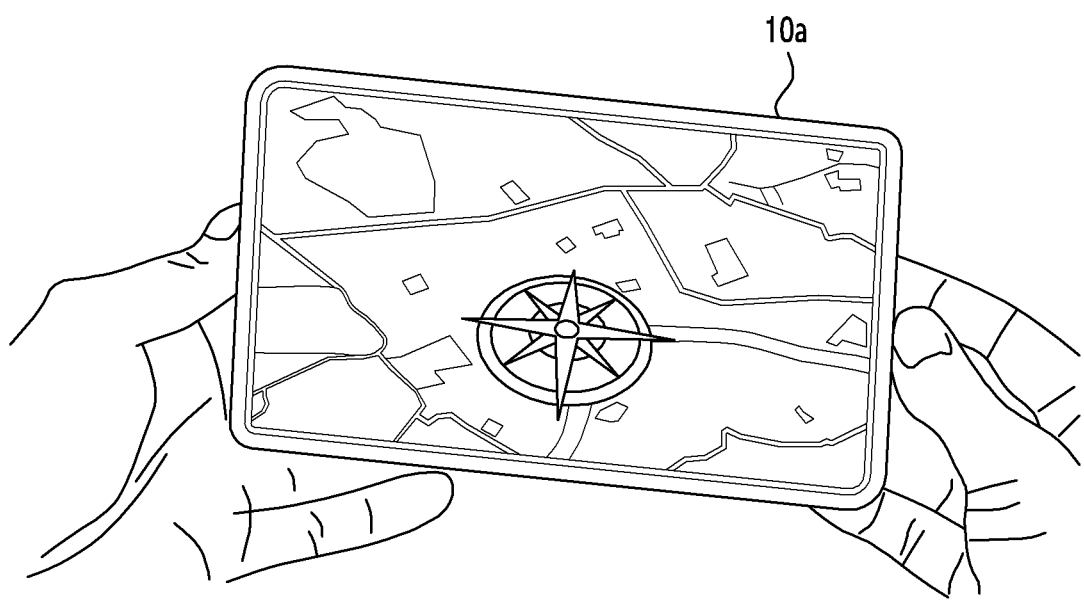
FIG. 1A is an exemplary diagram illustrating support of an azimuth service in a mobile device equipped with a geomagnetic sensor, according to an embodiment.

Hereinafter, various embodiments disclosed in the present disclosure will be described with reference to the accompanying drawings. For convenience of explanation, the size of the components shown in the drawings may be exaggerated or reduced, and embodiments consistent with the disclosure are not necessarily limited by the drawings.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

Figure 1B:
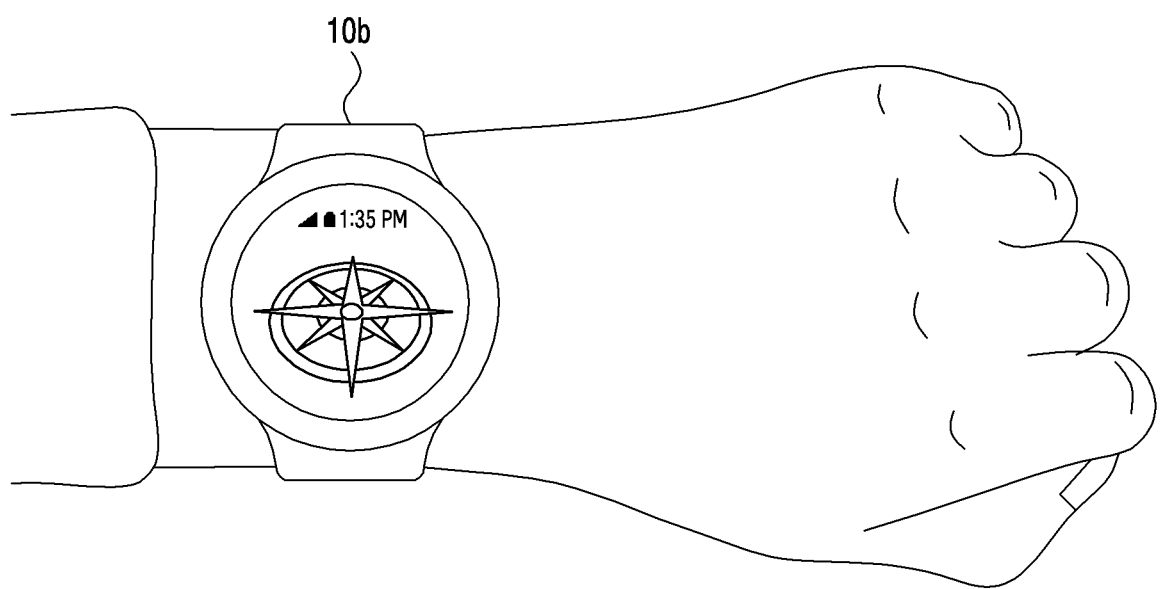
FIG. 1B is an exemplary diagram illustrating support of an azimuth service in a wearable device equipped with a geomagnetic sensor, according to an embodiment.

FIG. 1A is an exemplary diagram illustrating support of an azimuth service in a mobile device equipped with a geomagnetic sensor, according to an embodiment. FIG. 1B is an exemplary diagram illustrating support of an azimuth service in a wearable device equipped with a geomagnetic sensor, according to an embodiment.

Referring to FIG. 1A and FIG. 1B, the mobile device 10a (e.g., a smart phone or tablet) or the wearable device 10b (e.g., a smart watch or smart glasses) of an embodiment may be equipped with various sensors. For example, when the mobile device 10a or the wearable device 10b is equipped with a geomagnetic sensor, the mobile device 10a or the wearable device 10b may present azimuth information to a user, based on geomagnetic data acquired by the geomagnetic sensor.

According to an embodiment, when an application (e.g., a map application and a compass application) requiring azimuth information is executed in the mobile device 10a or the wearable device 10b, an application processor may request geomagnetic data or request azimuth information to a sensor hub (or a processor in the sensor hub). In this case, the sensor hub may check the accuracy of the geomagnetic sensor, before presenting the azimuth information to the application processor. The sensor hub may mean a low-power processor. While the sensor hub is operating, some or all functions of a main processor, for example, an application processor may be in a disabled state. However, this is an example, and both the low-power processor and the application processor may operate in a state where sufficient power supply is guaranteed or is required by a user device or a user as well.

According to an embodiment, the accuracy of the geomagnetic sensor may be determined based on a geomagnetic data value measured by a three-axis sensor. For example, the accuracy of the geomagnetic sensor may be higher as the geomagnetic data value measured by the three-axis sensor is closer to the sphere in a three-dimensional space. According to an embodiment, the accuracy of the geomagnetic sensor may be relatively determined in a range of 0 to 3. As the accuracy of the geomagnetic sensor has a value closer to 3, accurate geomagnetic data may be measured, and magnetic north may be measured closer to the earth's magnetic field by using the geomagnetic sensor.

According to an embodiment, when the accuracy of the geomagnetic sensor is less than a preset threshold value, the sensor hub may request an operation for performing geomagnetic sensor calibration to a user. The sensor hub may present geomagnetic data or azimuth information to the application processor after calibration of the geomagnetic sensor is completed. According to an embodiment, data collected from the geomagnetic sensor may be used for a process of calibration of the geomagnetic sensor. According to an embodiment, when the accuracy of the geomagnetic sensor is equal to or greater than a preset threshold value, the sensor hub may immediately present geomagnetic data or azimuth information to the application processor. The application processor receiving the geomagnetic data or the azimuth information may support an azimuth service to the user.

In FIG. 1A and FIG. 1B, support of the azimuth service in the mobile device 10*a* and the wearable device 10*b* has been described as an example, but it is not limited thereto, and various embodiments described in the present disclosure may be applied to various electronic devices equipped with geomagnetic sensors.

Figure 2:
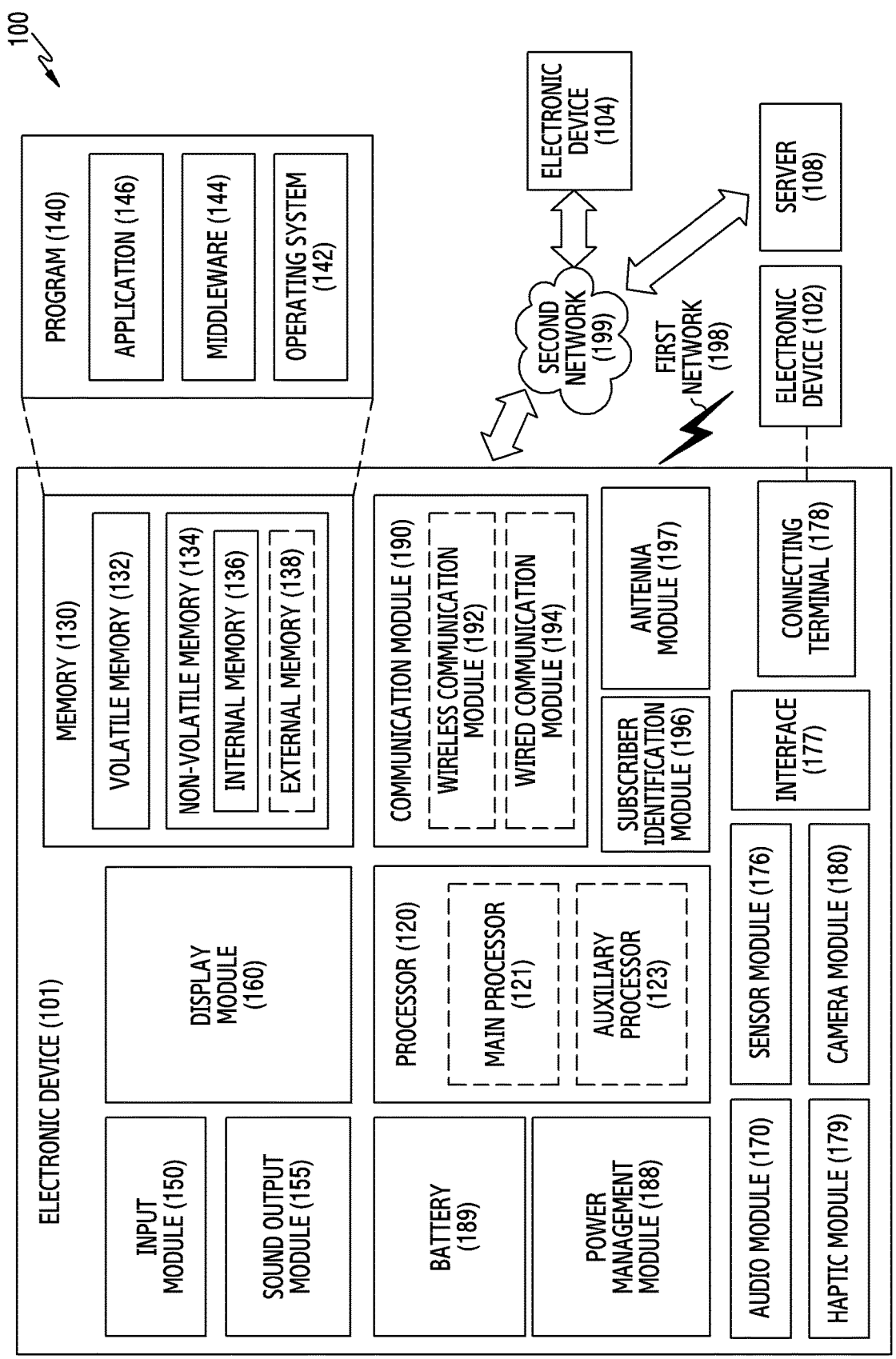
FIG. 2 is a block diagram of an electronic device in a network environment, according to various embodiments.

FIG. 2 is a block diagram illustrating an electronic device 101 in a network environment 100 according to various embodiments.

Referring to FIG. 2, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may be, for example, a processor provided separately from the processor 120 and/or the main processor 121 and configured to be optimized for low-power operation. According to an embodiment, the auxiliary processor 123 may have less computing power than the main processor 121 and may include a more limited interface and memory to relatively minimize current consumption and enable continuous operation. The auxiliary processor 123 may, for example, collect sensing data in association with at least one sensor (e.g., an acceleration sensor, a gyro sensor, a geomagnetic sensor, etc.), and use the collected sensing data to user context data representing an activity state (e.g., sitting, standing, walking, running, etc.) of the user may be calculated.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
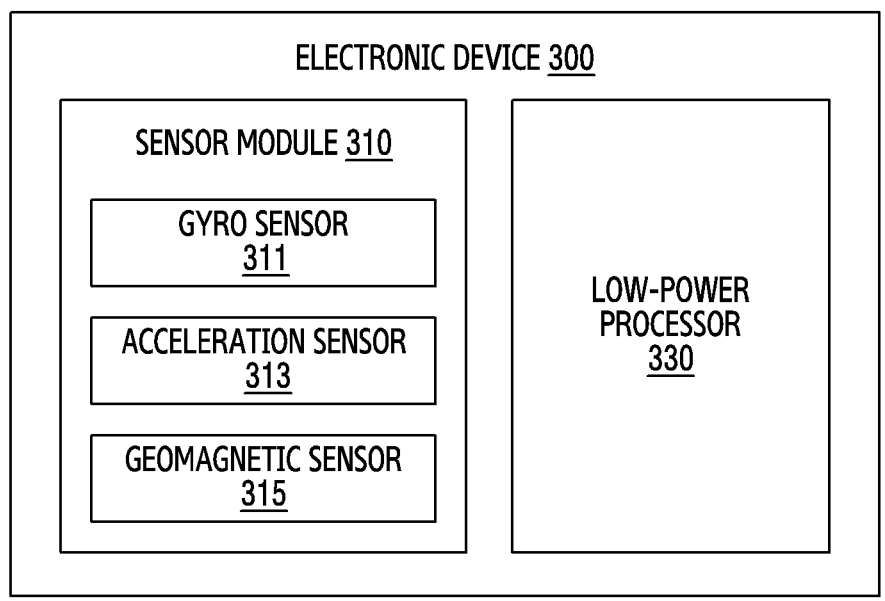
FIG. 3 is an exemplary diagram illustrating an electronic device supporting an azimuth service according to an embodiment.

FIG. 3 is an exemplary diagram illustrating an electronic device 300 (e.g., the electronic device 101 of FIG. 2) supporting an azimuth service according to an embodiment.

Referring to FIG. 3, the electronic device 300 of an embodiment may include a sensor module 310 (e.g., the sensor module 176 of FIG. 2) and a low-power processor 330 (e.g., the auxiliary processor 123 of FIG. 2). Components constituting the electronic device 300 are not limited thereto, and may further include at least one component of the electronic device 101 of FIG. 2, and may include various other components.

According to an embodiment, the sensor module 310 may include a gyro sensor 311, an acceleration sensor 313, and/or a geomagnetic sensor 315. The sensors included in the sensor module 310 may detect various physical quantities related to the motion of the electronic device 300 or detect various physical quantities around the electronic device 300, and may present sensing data in response to a signal requesting the detected data. According to an embodiment, the sensors included in the sensor module 310 may always be in an activated state, or may be in an inactive state and then be activated only when there is a request for sensing data and detect data as well. According to an embodiment, it may be more advantageous to reduce current consumption of the electronic device 300, when the sensor is in an inactive state and then is changed to an active state only when sensing data is needed, than when the sensor is always in an active state. According to an embodiment, the sensor module 310 may further include various types of sensors other than the gyro sensor 311, the acceleration sensor 313, and/or the geomagnetic sensor 315.

According to an embodiment, when the sensors included in the sensor module 310 are in an active state, at least one sensor included in the sensor module 310 may be set to detect data at predetermined intervals. The data detection interval may be determined according to current consumption of the electronic device 300 and/or a situation in which sensing data is required, and the data detection interval may be set differently every each sensor. According to an embodiment, the data detection interval may be displayed using a sample rate, and may be displayed in units of Hertz (Hz) according to the number of times of detecting or sampling data over one second.

According to an embodiment, the sensor module 310 may include the gyro sensor 311, and the gyro sensor 311 may be disposed in an internal space of a housing forming an exterior of the electronic device 300. According to an embodiment, the gyro sensor 311 may measure angular velocity data of the motion of the electronic device 300 along a plurality of axes such as three axes (e.g., x-axis, y-axis, and z-axis), six axes, or nine axes. The gyro sensor 311 may measure the amount of orientation change dependent on the motion of the electronic device 300, or the degree of rotation of the electronic device 300, by using the property of always maintaining an initially set direction regardless of the rotation of the earth.

According to an embodiment, the sensor module 310 may include the acceleration sensor (accelerometer) 313, and the acceleration sensor 313 may be disposed in the internal space of the housing forming the exterior of the electronic device 300. The acceleration sensor 313 of an embodiment may measure three-axis (e.g., x-axis, y-axis, and z-axis) acceleration data with respect to the motion of the electronic device 300. According to an embodiment, the acceleration sensor 313 may measure a force (vector) applied to the moving electronic device 300 by using the sensed data, and may also measure motion information about the rotating electronic device 300. For example, when the electronic device 300 does not move, a value corresponding to gravitational acceleration may be measured, and when the electronic device 300 moves, a value corresponding to the amount of acceleration change may be measured in a corresponding direction.

According to an embodiment, the sensor module 310 may include the geomagnetic sensor 315, and the geomagnetic sensor 315 may be disposed in the internal space of the housing forming the exterior of the electronic device 300. The geomagnetic sensor 315 of an embodiment may detect geomagnetism around the electronic device 300, and measure geomagnetic data in three axes (e.g., x-axis, y-axis, and z-axis). According to an embodiment, the north detected by the geomagnetic sensor 315 may be referred to as magnetic north, and azimuth information may be acquired by calculating an angle based on the magnetic north. According to an embodiment, the accuracy of the geomagnetic sensor 315 may be lowered due to the influence of an electro/magnetic surrounding environment, and in this case, the accuracy may be improved again through a process of calibrating the geomagnetic sensor 315.

According to an embodiment, the gyro sensor 311 and the acceleration sensor 313 may be sensors that measure data related to the motion of the electronic device 300, and the geomagnetic sensor 315 may be a sensor that measures data related to an environment state around the electronic device 300. According to an embodiment, acceleration data measured by the acceleration sensor 313 and geomagnetic data measured by the geomagnetic sensor 315 may be used as data for performing calibration of data measured using the geomagnetic sensor 315 by the low-power processor 330 of the electronic device 300, and besides this, data measured by various sensors may be used for calibration of data measured using the geomagnetic sensor 315.

The low-power processor 330 of an embodiment may include a generic processor configured to execute a hardware module or software (e.g., an application program). According to one embodiment, the low-power processor 330 may be a processor that consumes less power than a generic processor, and may be a processor (or a sensor hub itself) included in the sensor hub and controlling operations related to sensors. The low-power processor 330 may control a hardware component (function) or a software element (program) that includes at least one of various sensors installed in the electronic device 300, a data measurement module, an input/output interface, a module for managing a state or environment of the electronic device 300, and a communication module. In various embodiments described in the present disclosure, the low-power processor 330 with low current consumption may be used to collect the acceleration data, determine a motion pattern of the electronic device 300, and perform calibration of the geomagnetic sensor 315.

According to an embodiment, the low-power processor 330 may be electrically connected to the gyro sensor 311, the acceleration sensor 313, and the geomagnetic sensor 315 of the electronic device 300, and may control at least one of the gyro sensor 311, the acceleration sensor 313, and the geomagnetic sensor 315 so as to perform calibration on data measured using the geomagnetic sensor 315. As an instruction stored in a memory of the electronic device 300 is executed, the low-power processor 330 of an embodiment may control at least one of the gyro sensor 311, the acceleration sensor 313, and the geomagnetic sensor 315.

The low-power processor 330 of an embodiment may operate the acceleration sensor 313 while the gyro sensor 311 is inactive The low-power processor 330 may determine whether the motion of the electronic device 300 corresponds to any one of a first motion pattern and a second motion pattern, based on the acceleration data acquired by the acceleration sensor 313. Each of the first motion pattern and the second motion pattern may be a predetermined motion pattern, examples of which will be disclosed further herein. The low-power processor 330 may drive the geomagnetic sensor 315 to thereby acquire geomagnetic data; more specifically, the low-power processor 330 may acquire first geomagnetic data at a first sample rate when the motion of the electronic device 300 corresponds to the first motion pattern, and may acquire second geomagnetic data at a second sample rate higher than the first sample rate when the motion of the electronic device 300 corresponds to the second motion pattern. The low-power processor 330 may calibrate data measured using the geomagnetic sensor 315, based on the first geomagnetic data or the second geomagnetic data.

According to an embodiment, the electronic device 300 may further include a memory. The memory of an embodiment may store various data used by at least one component (e.g., the low-power processor 330) of the electronic device 300. According to an embodiment, the memory may store a variety of data wherein the electronic device 300 may perform calibration on data measured using the geomagnetic sensor 315. For example, the data may include sensing data (e.g., acceleration data and/or geomagnetic data) acquired by a sensor, and may include input data or output data about related software (e.g., the program 140 of FIG. 2) and commands related thereto as well. According to an embodiment, the memory may store at least one instruction for performing calibration on data measured using the geomagnetic sensor 315.

According to an embodiment, the electronic device 300 may further include a display. The display of an embodiment may be disposed in the housing of the electronic device 300 and be visually exposed on a front surface of the electronic device 300. According to an embodiment, the display may visually present information to the outside (e.g., a user) of the electronic device 300 and display various contents (e.g., a text, an image, a video, an icon, or a symbol). For example, the display may visually present calibrated information on data measured using the geomagnetic sensor 315 to a user.

Figure 4:
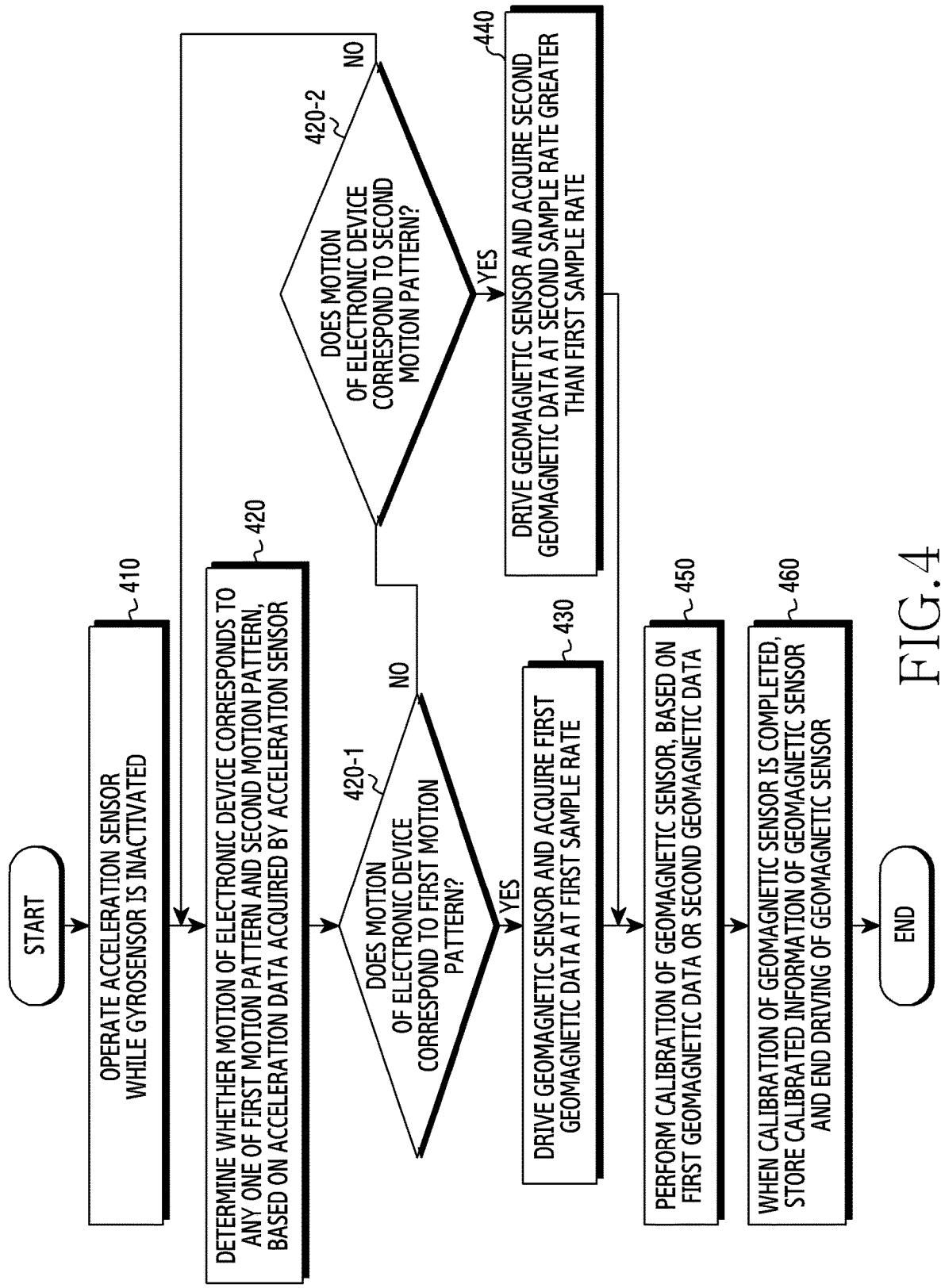
FIG. 4 is a flowchart illustrating a method for calibrating a geomagnetic sensor of an electronic device according to an embodiment.

FIG. 4 is a flowchart illustrating a method for calibrating data measured using a geomagnetic sensor 315 of an electronic device (e.g., the electronic device 101 of FIG. 2 or the electronic device 300 of FIG. 3) according to an embodiment.

The order of operations shown in the drawings of example embodiments is for explanation of one embodiment, and at least a part may be omitted, and its order may be changed. For example, operation 420-1 may be performed after operation 420-2 is performed as well.

Operations of FIG. 4 may be performed by the electronic device 300 of FIG. 3. Referring to FIG. 4, the low-power processor 330 of the electronic device 300 of an embodiment may perform operation 410 of operating the acceleration sensor 313 while the gyro sensor 311 is inactive, operation 420 of determining whether the motion of the electronic device 300 corresponds to any one of a first motion pattern and a second motion pattern, based on acceleration data acquired by the acceleration sensor 313, operation 430 of driving the geomagnetic sensor 315 and acquiring first geomagnetic data at a first sample rate when the motion of the electronic device 300 corresponds to the first motion pattern, operation 440 of driving the geomagnetic sensor 315 and acquiring second geomagnetic data at a second sample rate higher than the first sample rate when the motion of the electronic device 300 corresponds to the second motion pattern, operation 450 of performing calibration on data measured using the geomagnetic sensor 315, based on the first geomagnetic data or the second geomagnetic data, and operation 460 of storing calibrated information of the geomagnetic sensor 315 and ending the driving of the geomagnetic sensor 315, when the calibration on the data measured using the geomagnetic sensor 315 is completed.

According to an embodiment, the low-power processor 330 may perform calibration by always driving the geomagnetic sensor 315 in order to calibrate the geomagnetic sensor 315, but keeping the geomagnetic sensor 315 always active may be disadvantageous in terms of current consumption. Table 1 below is a table for explaining current consumption dependent on a sensor type and a sample rate at which data is acquired by the sensor.

TABLE 1

| Sensor type | Sample rate | Average current consumption |
|---|---|---|
| Acceleration sensor | 100 Hz | 0.036 mA |
| Acceleration sensor + Gyro sensor | 100 Hz | 0.462 mA |
| Geomagnetic sensor | 100 Hz | 1.100 mA |

TABLE 1-continued

| Sensor type | Sample rate | Average current consumption |
|---|---|---|
| Acceleration sensor | 20 Hz | 0.028 mA |
| Geomagnetic sensor | 20 Hz | 0.220 mA |

Referring to Table 1 above, it may be seen that the current consumption of the geomagnetic sensor 315 is greater than that of the acceleration sensor 313 or the gyro sensor 311. Therefore, the low-power processor 330 of an embodiment may drive the geomagnetic sensor 315 and calibrate the geomagnetic sensor 315, only when a specific motion pattern of the electronic device 300 is detected, and adjust a sample rate of the geomagnetic sensor 315 according to the determined motion pattern and calibrate data measured using the geomagnetic sensor 315. In operation 410, the low-power processor 330 of an embodiment may operate the acceleration sensor 313 while the gyro sensor 311 is inactive. According to an embodiment, the low-power processor 330 may use data acquired by the gyro sensor 311 and data acquired by the acceleration sensor 313, together, in order to determine the motion pattern of the electronic device 300. In another embodiment, the low-power processor 330 may use only any one of the data acquired by the gyro sensor 311 and the data acquired by the acceleration sensor 313 as well. However, considering the current consumption of Table 1 above, it may be advantageous to determine the motion pattern of the electronic device 300 by using only one sensor, and it may be advantageous to determine the motion pattern of the electronic device 300 by using only the acceleration sensor 313 rather than the gyro sensor 311.

According to an embodiment, in operation 410, the low-power processor 330 may always operate the acceleration sensor 313 while the gyro sensor 311 is inactive, and may also always operate the acceleration sensor 313 regardless of whether the gyro sensor 311 is activated or not. The acceleration sensor 313 may be configured to sense acceleration data at a predetermined time interval, and according to an embodiment, the acceleration sensor 313 may acquire acceleration data while operating at a low sample rate (e.g., 20 Hz). That is, "always operating" may herein mean that the acceleration sensor 313 is continuously operating at a predetermined sample rate, for example, 20 Hz.

In operation 420, the low-power processor 330 of an embodiment may determine whether the motion of the electronic device 300 corresponds to any one of a first motion pattern and a second motion pattern, based on the acceleration data acquired by the acceleration sensor 313. According to an embodiment, the acceleration data is sensing data about the motion of the electronic device 300, and may include information about the motion of the electronic device 300. The acceleration data may include acceleration signals for each of a plurality of axes (e.g., x-axis, y-axis, and z-axis) detected by the acceleration sensor 313, and the low-power processor 330 may determine a motion pattern of the electronic device 300, based on at least some of the acquired acceleration data. Hereinafter, a method for determining the motion pattern of the electronic device 300 in operation 420 will be described in detail with reference to FIG. 5.

Figure 5:
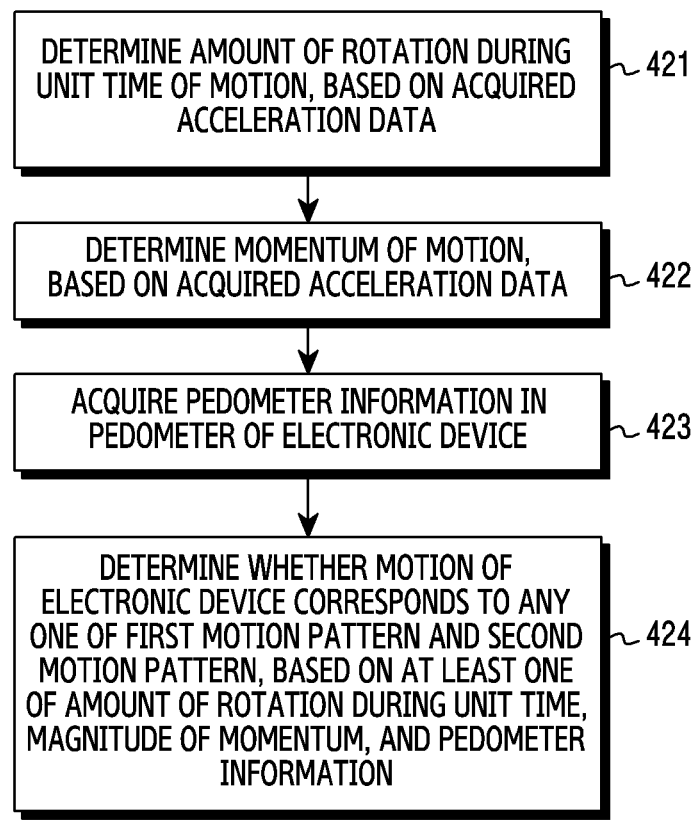
FIG. 5 is a flowchart illustrating a method for determining whether the motion of an electronic device corresponds to any one of a first motion pattern and a second motion pattern, according to an embodiment.

FIG. 5 is a flowchart illustrating a method for determining whether the motion of the electronic device 300 corresponds to any one of a first motion pattern and a second motion pattern, according to an embodiment.

Referring to FIG. 5, the low-power processor 330 of the electronic device 300 of an embodiment may perform operation 421 of determining the amount of rotation during a predefined unit time of motion, based on acquired acceleration data, in order to determine a motion pattern of the electronic device 300, operation 422 of determining a magnitude of the momentum of the motion of the electronic device 300, based on the acquired acceleration data, operation 423 of acquiring pedometer information in a pedometer that uses an acceleration sensor of the electronic device 300, and operation 424 of determining whether the motion of the electronic device 300 corresponds to any one of a first motion pattern and a second motion pattern, based on at least one of the amount of rotation during the unit time, the magnitude of momentum, and the pedometer information. According to an embodiment, at least one of operations 421 to 423 of FIG. 5 may be omitted. For example, the low-power processor 330 may perform only operation 421 and omit operations 422 and 423, or perform only operations 421 and 422 and omit operation 423.

According to an embodiment, the first motion pattern may be a motion pattern of an operation that occurs at a slow speed for a long time. For example, the first motion pattern may be a motion pattern of a walking operation, but is not limited thereto. According to an embodiment, the second motion pattern may be a motion pattern of an operation that occurs at a higher speed and for a shorter time than those of the first motion pattern. For example, the second motion pattern may be a motion pattern of an operation of lifting the electronic device 300, but is not limited thereto.

Figure 6:
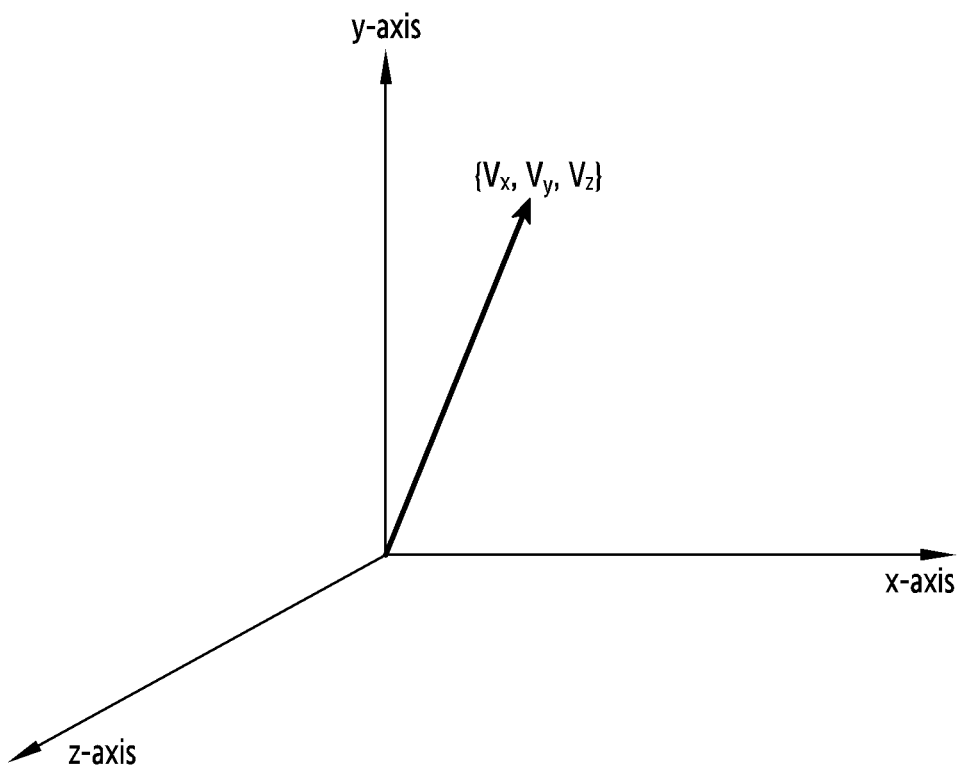
FIG. 6 is a graph illustrating a 3D vector of acceleration data acquired from an acceleration sensor of an electronic device according to an embodiment.

FIG. 6 is a graph illustrating a 3D vector of acceleration data acquired by the acceleration sensor 313 of the electronic device 300 according to an embodiment.

According to an embodiment, coordinates ($v_x$, $v_y$, $v_z$) of the 3D vector may be acquired through Equation 1 below, based on acceleration data along the three axes ($A_x$, $A_y$, $A_z$).

$$v_x = \sqrt{A_x^2 + A_y^2}, v_y = \sqrt{A_y^2 + A_z^2}, v_z = \sqrt{A_x^2 + A_z^2} \quad \text{[Equation 1]}$$

According to an embodiment, rotation angles ($\varphi$, $\theta$, $\psi$) of three axes may be acquired through Equation 2 below, based on the acceleration data.

$$\varphi = \arctan\left(\frac{x}{\sqrt{A_y^2 + A_z^2}}\right), \theta = \arctan\left(\frac{y}{\sqrt{A_x^2 + A_z^2}}\right), \quad \text{[Equation 2]}$$
$$\psi = \left(\frac{\sqrt{A_x^2 + A_y^2}}{z}\right)$$

According to an embodiment, in operation 421, the low-power processor 330 may determine the amount of rotation during a unit time of the motion of the electronic device 300, based on acceleration data acquired by the acceleration sensor 313. According to an embodiment, the low-power processor 330 may acquire the degree of rotation, that is, the amount of rotation during the unit time of the motion of the electronic device 300, based on rotation angles ($\varphi$, $\theta$, and $\psi$) of three axes.

According to an embodiment, in operation 422, the low-power processor 330 may determine the momentum of the motion of the electronic device 300, based on the acceleration data acquired by the acceleration sensor 313. According to an embodiment, the low-power processor 330 may acquire the momentum of the motion of the electronic device 300 by acquiring a magnitude of a 3D vector.

According to an embodiment, in operation 423, the low-power processor 330 may acquire pedometer information from a pedometer of the electronic device 300. According to an embodiment, the pedometer information may be information about a walking operation of a user of the electronic device 300 that is determined based on the acceleration data acquired by the acceleration sensor 313. That is, the pedometer of the electronic device 300 may detect information about a user's step through impulse information acquired based on the acceleration data. According to an embodiment, the pedometer information acquired in operation 423 may be used to determine whether the motion of the electronic device 300 corresponds to a first motion pattern (e.g., a motion pattern of a walking operation) in operation 424.

According to an embodiment, in operation 424, the low-power processor 330 may determine whether the motion of the electronic device 300 corresponds to any one of a first motion pattern and a second motion pattern, based on at least one of the amount of rotation during the unit time, the magnitude of momentum, and the pedometer information.

According to an embodiment, in operation 424, when the amount of rotation during the unit time determined in operation 421 corresponds to a first range, the low-power processor 330 may determine the motion of the electronic device 300 as the first motion pattern, and when the determined amount of rotation during the unit time corresponds to a second range having a greater value than the first range, the low-power processor 330 may determine the motion of the electronic device 300 as the second motion pattern.

According to an embodiment, in operation 424, when the magnitude of the momentum determined in operation 422 corresponds to a third range, the low-power processor 330 may determine the motion of the electronic device 300 as the first motion pattern, and when the determined magnitude of momentum corresponds to a fourth range having a greater value than the third range, the low-power processor 330 may determine the motion of the electronic device 300 as the second motion pattern.

According to an embodiment, in operation 424, the low-power processor 330 may determine whether the motion of the electronic device 300 corresponds to the first motion pattern, by additionally using the pedometer information acquired in operation 423 together with the amount of rotation during the unit time and the momentum determined in operations 421 and 422.

The low-power processor 330 of an embodiment may determine whether the motion of the electronic device 300 corresponds to the first motion pattern or corresponds to the second motion pattern, by using any one of a method for determining a motion pattern based on the above-described amount of rotation during the unit time, a method for determining a motion pattern based on the magnitude of the momentum, and a method for determining a motion pattern based on the pedometer information, and may also determine whether the motion of the electronic device 300 corresponds to the first motion pattern or corresponds to the second motion pattern by combining two or more methods.

Referring again to FIG. 4, when determining that the motion of the electronic device 300 corresponds to the first motion pattern in operation 420-1 (420-1: Yes), the low-power processor 330 of an embodiment may drive the geomagnetic sensor 315 and acquire first geomagnetic data at a first sample rate in operation 430, and when determining that the motion of the electronic device 300 corresponds to the second motion pattern in operation 420-2 (420-2: Yes), the low-power processor 330 may drive the geomagnetic sensor 315 and acquire second geomagnetic data at a second sample rate higher than the first sample rate in operation 440.

Figure 7A:
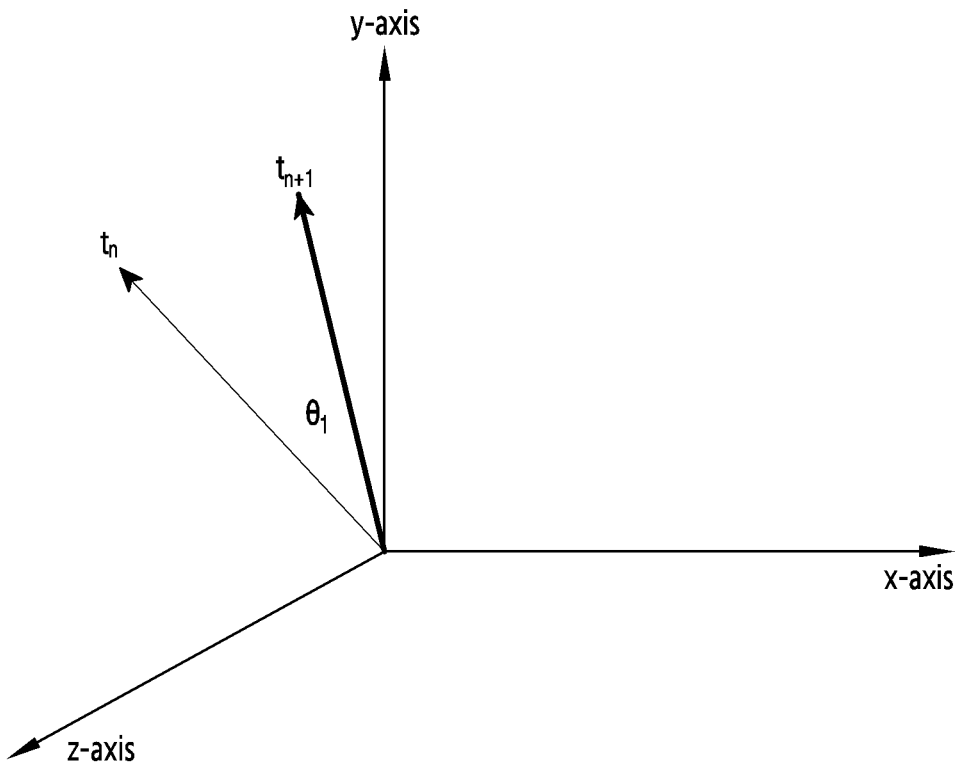
FIG. 7A is a graph illustrating, by a 3D vector, intervals of geomagnetic data acquired from a geomagnetic sensor when the motion of an electronic device corresponds to a first motion pattern according to an embodiment.
Figure 7B:
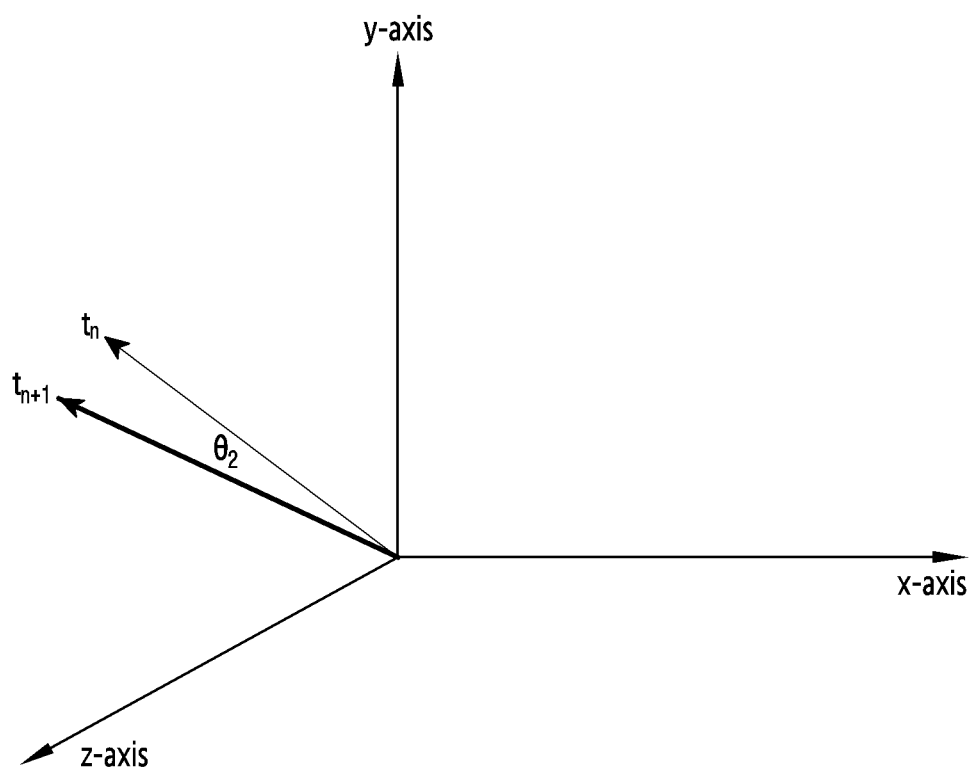
FIG. 7B is a graph illustrating, by a 3D vector, intervals of geomagnetic data acquired from a geomagnetic sensor when the motion of an electronic device corresponds to a second motion pattern according to an embodiment.

FIG. 7A is a graph illustrating, by a 3D vector, intervals of geomagnetic data acquired by the geomagnetic sensor 315 when the motion of the electronic device 300 corresponds to a first motion pattern according to an embodiment. FIG. 7B is a graph illustrating, by a 3D vector, intervals of geomagnetic data acquired by the geomagnetic sensor 315 when the motion of the electronic device 300 corresponds to a second motion pattern according to an embodiment.

In FIG. 7A, $\theta_1$ represents an interval between samples at which the geomagnetic sensor 315 acquires first geomagnetic data at a first sample rate, and in FIG. 7B, $\theta_2$ represents an interval between samples at which the geomagnetic sensor 315 acquires second geomagnetic data at a second sample rate. Referring to FIGS. 7A and 7B, since the second sample rate is higher than the first sample rate, a value of the interval ($\theta_2$) of acquiring the second geomagnetic data may be smaller than the interval ($\theta_1$) of acquiring the first geomagnetic data.

According to an embodiment, the first sample rate and second sample rate corresponding to the intervals for acquiring the geomagnetic data may have predetermined values that are set according to whether the motion of the electronic device 300 corresponds to the first motion pattern or corresponds to the second motion pattern. According to an embodiment, the first sample rate and second sample rate corresponding to the intervals for acquiring the geomagnetic data may have values that change in proportion to a magnitude of a factor (e.g., the amount of rotation during a unit time, and the momentum) used to determine whether the motion of the electronic device 300 corresponds to the first motion pattern or corresponds to the second motion pattern.

Figure 8:
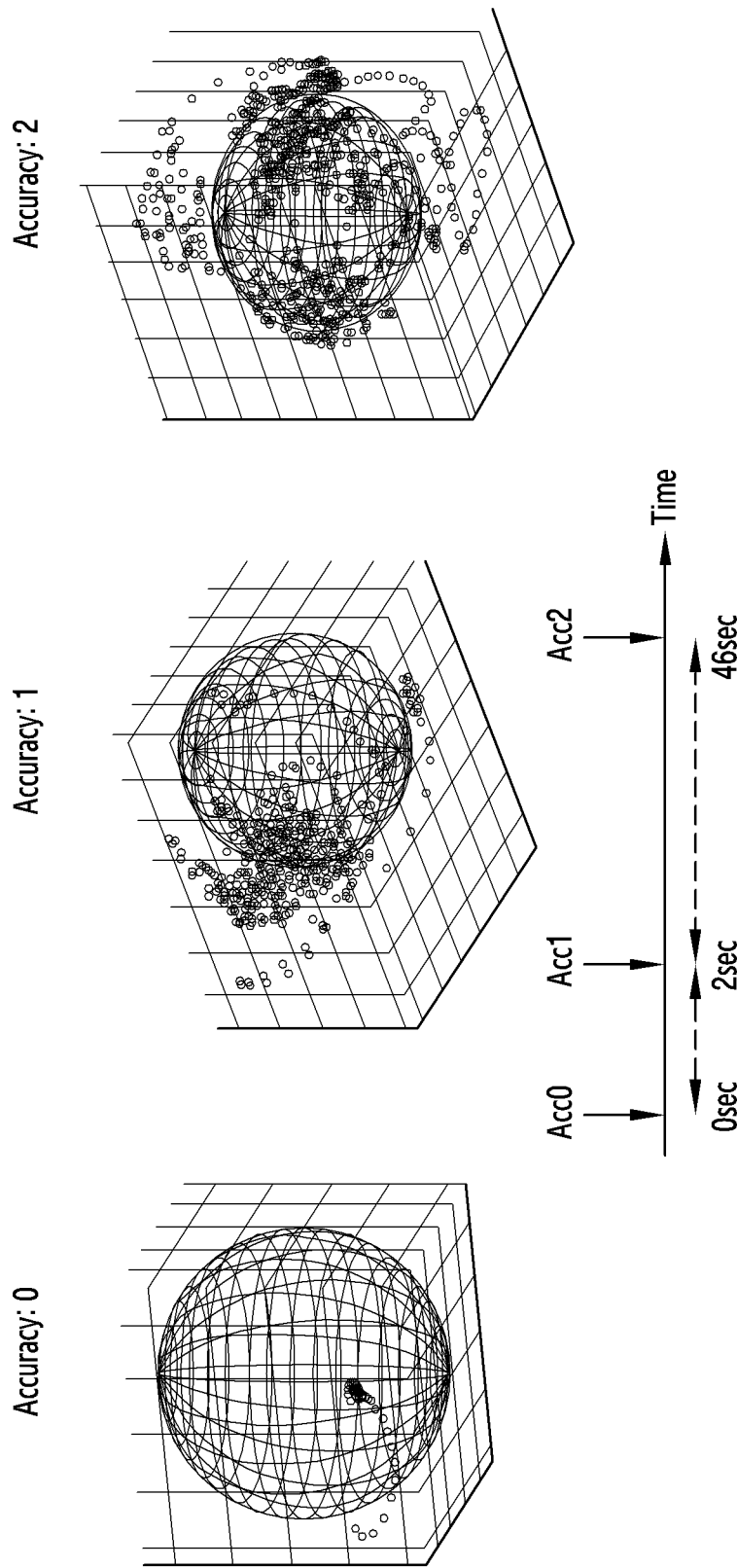
FIG. 8 is a graph illustrating first geomagnetic data collected at a first sample rate by a geomagnetic sensor and a time required for accuracy improvement of the geomagnetic sensor according to an embodiment.
Figure 9:
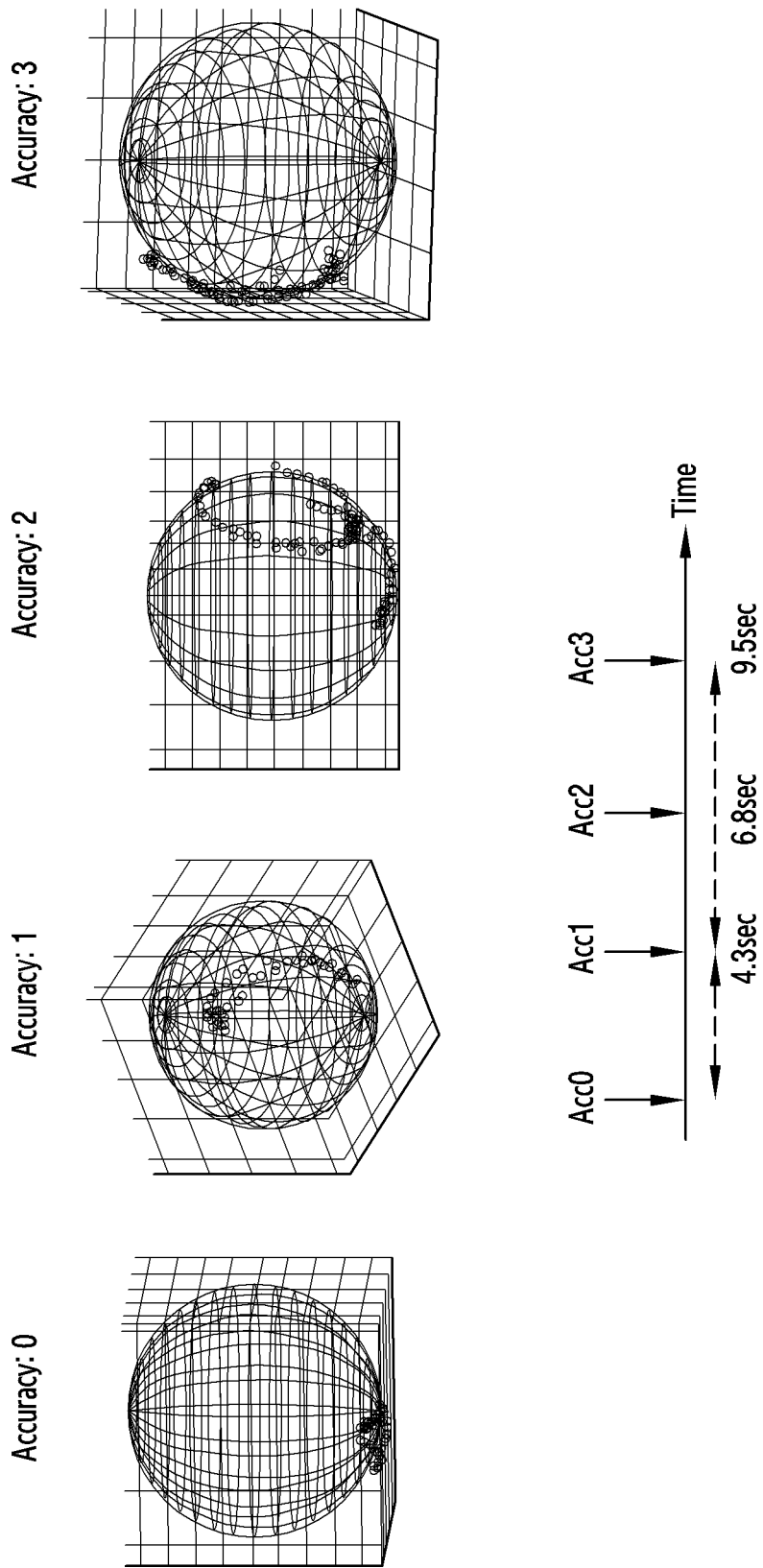
FIG. 9 is a graph illustrating second geomagnetic data collected at a second sample rate by a geomagnetic sensor and a time required for accuracy improvement of the geomagnetic sensor according to an embodiment.

FIG. 8 is a graph illustrating first geomagnetic data collected at a first sample rate (e.g., 20 Hz) by the geomagnetic sensor 315 and a time required for accuracy improvement of the geomagnetic sensor 315 according to an embodiment. FIG. 9 is a graph illustrating second geomagnetic data collected at a second sample rate (e.g., 100 Hz) by the geomagnetic sensor 315 and a time required for accuracy improvement of the geomagnetic sensor 315 according to an embodiment.

Comparing FIG. 8 and FIG. 9, when the motion of the electronic device 300 corresponds to a first motion pattern, it may be confirmed that the first geomagnetic data acquired at the first sample rate is collected over a wide range of a 3D space. When the motion of the electronic device 300 corresponds to a second motion pattern, it may be confirmed that the second geomagnetic data acquired at the second sample rate is densely collected in a narrow range of the 3D space.

Referring again to FIG. 4, in operation 450, the low-power processor 330 of an embodiment may calibrate data measured using the geomagnetic sensor 315, based on the first geomagnetic data acquired in operation 430 or the second geomagnetic data acquired in operation 440. According to an embodiment, the calibration of the data measured using the geomagnetic sensor 315 may refer to a process of improving the lowered accuracy of the geomagnetic sensor 315 and increasing it to a target accuracy value. According to an embodiment, in order to perform the calibration on the data measured using the geomagnetic sensor 315, the low-power processor 330 may collect the first geomagnetic data (or the second geomagnetic data) that may be estimated in a spherical shape in a 3D space from the geomagnetic sensor 315, and the collected data may be used to update the eccentricity and offset of an existing geomagnetic sensor data accuracy model (e.g., geomagnetic sensor data accuracy model before calibration).

According to an embodiment, a time required to calibrate data measured using the geomagnetic sensor 315 may vary depending on a sample rate at which the geomagnetic sensor 315 collects geomagnetic data.

Comparing FIG. 8 and FIG. 9, when the geomagnetic sensor 315 collects the first geomagnetic data at the first sample rate, it may be confirmed that it takes a long time to improve the accuracy of the geomagnetic sensor 315 (e.g., 46 seconds are required to improve to accuracy 2), and when the second geomagnetic data is collected at the second sample rate, it may be confirmed that the accuracy of the geomagnetic sensor 315 is improved within a short time (e.g., 6.8 seconds are required to improve to accuracy 2).

In operation 460, when the calibration on the data measured using the geomagnetic sensor 315 is completed, the low-power processor 330 of an embodiment may store the calibrated information of the geomagnetic sensor 315, and may end the driving of the geomagnetic sensor 315. According to an embodiment, since power consumption may be wasted when the geomagnetic sensor 315 is continuously driven, the low-power processor 330 may end the driving of the geomagnetic sensor 315 after completing the calibration on the data measured using the geomagnetic sensor 315, and may store the calibrated information in a memory. According to an embodiment, whenever the calibration is performed on the data measured using the geomagnetic sensor 315, the low-power processor 330 may store the calibrated information and may update the accuracy of the geomagnetic sensor 315.

According to an embodiment, after the calibration on the data measured using the geomagnetic sensor 315 is completed through operations 410 to 460 of FIG. 4, even if the first motion pattern or the second motion pattern is detected for a predetermined period of time, the low-power processor 330 need not perform the calibration on the data measured using the geomagnetic sensor 315. That is, since accuracy does not decrease immediately after the calibration on the data measured using the geomagnetic sensor 315 is completed, it is possible to prevent unnecessary calibration of the geomagnetic sensor 315 from being repeatedly performed.

Figure 10:
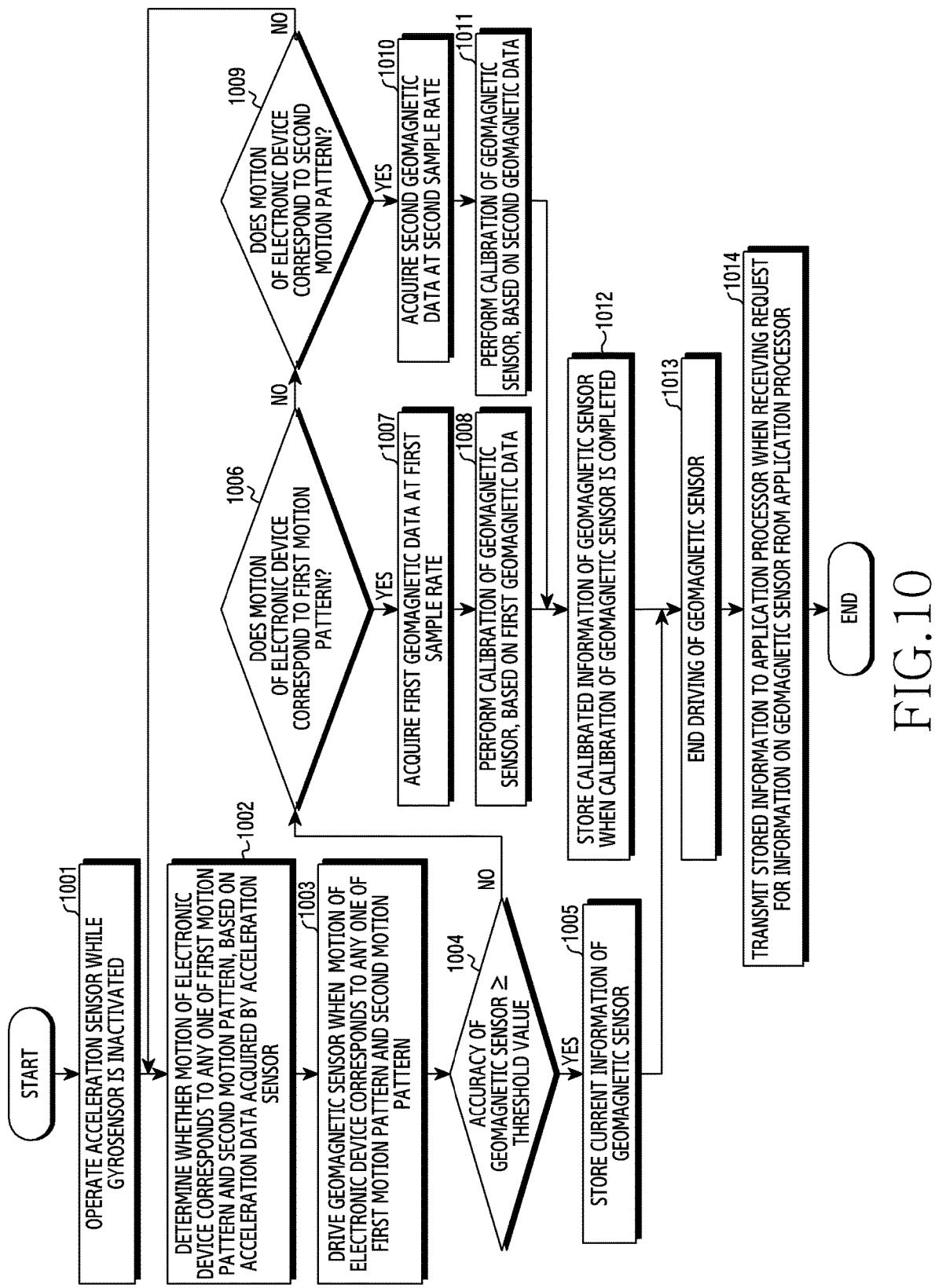
FIG. 10 is a flowchart illustrating a method for presenting calibrated information of a geomagnetic sensor to an application processor according to an embodiment.

FIG. 10 is a flowchart illustrating a method for presenting calibrated information of the geomagnetic sensor 315 to an application processor according to an embodiment.

According to an embodiment, even if the low-power processor 330 detects a first motion pattern or a second motion pattern, when the accuracy of the geomagnetic sensor 315 is greater than or equal to a preset threshold value (e.g., when calibration of the geomagnetic sensor 315 is unnecessary), the low-power processor 330 need not perform calibration on data measured using the geomagnetic sensor 315.

At least one of operations of FIG. 10 may correspond to at least one of operations of FIG. 4. For example, operation 1001 may correspond to operation 410, operation 1002 may correspond to operation 420, operation 1006 may correspond to operation 420-1, operation 1009 may correspond to operation 420-2, operations 1008 and 1011 may correspond to operation 450, and operations 1012 and 1013 may correspond to operation 460. Descriptions identical to, similar to, or corresponding to those described above will be omitted. Hereinafter, operations 1003, 1004, 1005, and 1014 of FIG. 10 will be described in detail.

Referring to FIG. 10, in operation 1003, when the motion of the electronic device 300 corresponds to any one of the first motion pattern and the second motion pattern, the low-power processor 330 of an embodiment may drive the geomagnetic sensor 315 that is in an inactive state. After driving the geomagnetic sensor 315, the low-power processor 330 may check the accuracy of the geomagnetic sensor 315 in operation 1004, and may compare an accuracy value of the geomagnetic sensor 315 with a preset threshold value. The accuracy of the geomagnetic sensor may be determined based on a geomagnetic data value measured by a three-axis sensor. Since the accuracy of the geomagnetic sensor has been described above with reference to FIG. 1A and FIG. 1B, a detailed description thereof will be omitted. When the accuracy of the geomagnetic sensor 315 is greater than or equal to a preset threshold value (1004: Yes), the low-power processor 330 may store current information (e.g., an accuracy value of the geomagnetic sensor 315, and an accuracy check time) of the geomagnetic sensor 315 in operation 1005, and may end the driving of the geomagnetic sensor 315 in operation 1013. When the accuracy of the geomagnetic sensor 315 is less than the preset threshold value (1004: No), in operations 1006 to 1012, the low-power processor 330 may acquire geomagnetic data according to whether the motion of the electronic device 300 corresponds to the first motion pattern or corresponds to the second motion pattern, and calibrate data measured using the geomagnetic sensor 315, and then may store calibrated information. That is, when the accuracy of the geomagnetic sensor 315 is less than the threshold value and the motion of the electronic device 300 corresponds to the first motion pattern, the low-power processor 330 may acquire first geomagnetic data at a first sample rate in operation 1007, and when the accuracy of the geomagnetic sensor 315 is less than the threshold value and the motion of the electronic device 300 corresponds to the second motion pattern, the low-power processor 330 may acquire second geomagnetic data at a second sample rate in operation 1010.

Referring to FIG. 10, after storing the current information measured using the geomagnetic sensor 315 (e.g., operation 1005) or after storing the calibrated information on the data measured using the geomagnetic sensor 315 (e.g., operation 1012), the low-power processor 330 of an embodiment may terminate the driving of the geomagnetic sensor 315 in operation 1013. Similar to operation 460, the low-power processor 330 may reduce power consumption by storing the information of the geomagnetic sensor 315 and then ending the driving of the geomagnetic sensor 315. Also, the low-power processor 330 may always update the accuracy of the geomagnetic sensor 315 by storing the information currently measured using the geomagnetic sensor 315 or the calibrated information on the measured data.

Referring to FIG. 10, according to an embodiment, in operation 1014, when receiving a request for information on the geomagnetic sensor 315 from the application processor, the low-power processor 330 may transmit the stored information of the geomagnetic sensor 315 to the application processor. According to an embodiment, by performing the calibration on the data measured using the geomagnetic sensor 315 and storing the information through operations 1001 to 1013, the low-power processor 330 may immediately transmit accurate geomagnetic information, even if not performing calibration of the geomagnetic sensor 315 whenever there is a request for information on the geomagnetic sensor 315 from the application processor. Accordingly, the application processor receiving the geomagnetic information may directly present a message including azimuth information to a user.

Figure 11:
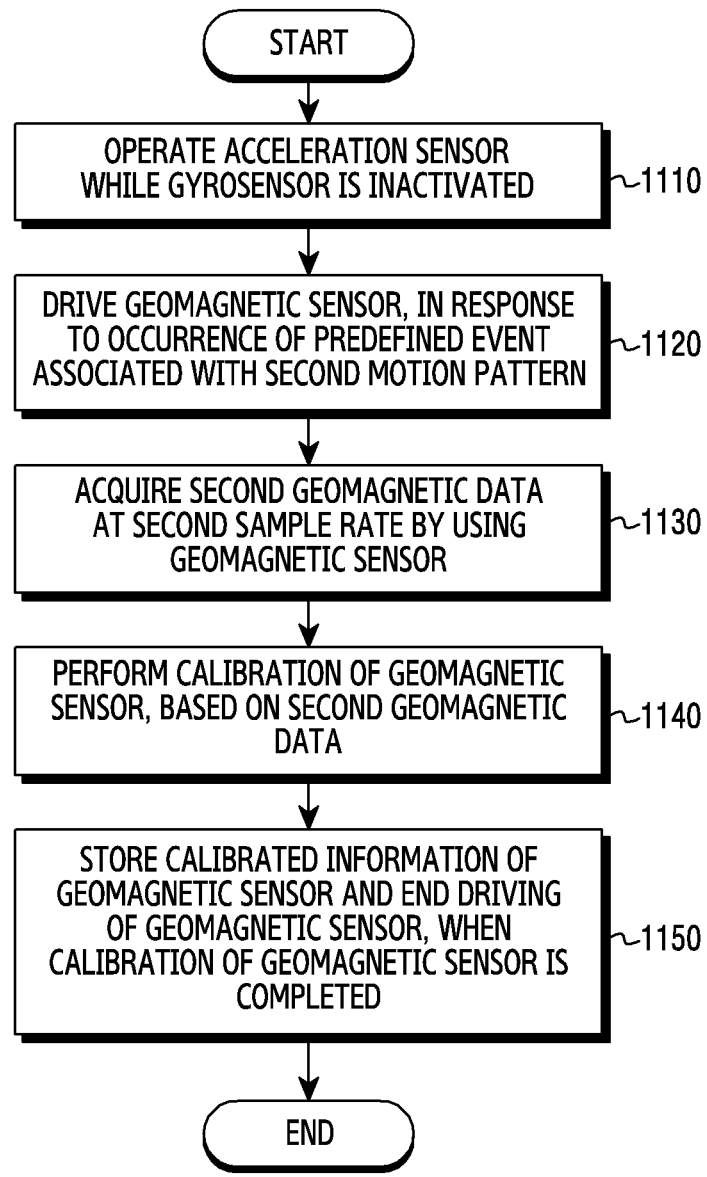
FIG. 11 is a flowchart illustrating a method for calibrating a geomagnetic sensor of an electronic device according to an embodiment.

FIG. 11 is a flowchart illustrating a method for calibrating the geomagnetic sensor 315 of the electronic device 300 according to an embodiment.

According to an embodiment, when a predefined event associated with a first motion pattern or a second motion pattern occurs, the low-power processor 330 may drive the geomagnetic sensor 315 in advance in order to acquire geomagnetic data for calibrating the geomagnetic sensor 315. According to an embodiment, even if operations of analyzing acceleration data and determining whether the motion of the electronic device 300 corresponds to the first motion pattern or the second motion pattern are not performed, the low-power processor 330 may drive the geomagnetic sensor 315, and may perform calibration on data measured using the geomagnetic sensor 315, when the predefined event associated with the first motion pattern or the second motion pattern occurs.

At least one of operations of FIG. 11 may correspond to at least one of operations of FIG. 4. For example, operation 1110 may correspond to operation 410, operation 1140 may correspond to operation 450, and operation 1150 may correspond to operation 460. Descriptions identical to, similar to, or corresponding to those described above will be omitted. Operation 1120 of FIG. 11 will be described in detail below.

Referring to FIG. 11, according to an embodiment, in operation 1120, the low-power processor 330 may drive the geomagnetic sensor 315 in response to occurrence of the predefined event related to the second motion pattern. For example, the event associated with the second motion pattern may be a call or message reception event. Since the motion of lifting the electronic device 300 may occur in a call or message reception situation, the call or message reception event may be predefined as the event associated with the second motion pattern in the electronic device 300. Accordingly, when a predefined incoming call event occurs, the low-power processor 330 may drive the geomagnetic sensor 315.

According to an embodiment, in operation 1130, the low-power processor 330 may acquire second geomagnetic data at a second sample rate by using the geomagnetic sensor 315. As driving the geomagnetic sensor 315 in advance at an appropriate sample rate according to detection of a predefined event, the low-power processor 330 may acquire data necessary for calibration from the beginning of the occurrence of the motion of the electronic device 300. The process of FIG. 11 may be useful in a motion pattern corresponding to a relatively fast motion. For example, assuming that the motion of lifting a terminal in response to an incoming call occurs for one second, data corresponding to an initial partial time (e.g., 0.1 second) of the motion might not be acquired, when the geomagnetic sensor 315 is driven after detection of a motion pattern. However, when the geomagnetic sensor 315 is driven at a second sample rate in advance at a time point when the incoming call event occurs, data for calibrating the geomagnetic sensor 315 may be acquired for the entire motion of lifting the terminal.

As described above, according to an embodiment, a method for calibrating a geomagnetic sensor of an electronic device (e.g., the electronic device 101 of FIG. 2, the electronic device 300 of FIG. 3) may include operating an acceleration sensor of the electronic device while a gyro sensor of the electronic device is inactivated (e.g., operation 410 of FIG. 4); determining whether motion of the electronic device corresponds to one of a predetermined first motion pattern and a predetermined second motion pattern, based on acceleration data acquired by the acceleration sensor (e.g., operation 420 of FIG. 4); driving the geomagnetic sensor to thereby acquire geomagnetic data, wherein, when the motion corresponds to the first motion pattern, the geomagnetic data is first geomagnetic data acquired at a first sample rate (e.g., operation 430 of FIG. 4), and, when the motion corresponds to the second motion pattern, the geomagnetic data is second geomagnetic data acquired at a second sample rate higher than the first sample rate by driving the geomagnetic sensor (e.g., operation 440 of FIG. 4); and calibrating the geomagnetic sensor, based on the geomagnetic data (e.g., operation 450 of FIG. 4).

According to an embodiment, the determining of whether the motion corresponds to one of the first motion pattern and the second motion pattern (e.g., operation 420 of FIG. 4) may include determining the amount of rotation of the motion during a predefined unit time, based on the acquired acceleration data, determining the motion to be the first motion pattern, when the amount of rotation during the unit time corresponds to a first range, and determining the motion to be the second motion pattern, when the amount of rotation during the unit time corresponds to a second range having a greater value than the first range.

According to an embodiment, the determining of whether the motion corresponds to one of the first motion pattern and the second motion pattern (e.g., operation 420 of FIG. 4) may be further based on information acquired by a pedometer of the electronic device.

According to an embodiment, the method for calibrating the geomagnetic sensor of the electronic device may further include storing calibrated information of the geomagnetic sensor and ending the driving of the geomagnetic sensor, when calibration of the geomagnetic sensor is completed (e.g., operation 460 of FIG. 4).

According to an embodiment, the method for calibrating the geomagnetic sensor of the electronic device may further include receiving a request for information on the geomagnetic sensor from an application processor of the electronic device, and in response to the request, providing the calibrated information to the application processor (e.g., operation 1014 of FIG. 10).

According to an embodiment, the method for calibrating the geomagnetic sensor of the electronic device may further include driving the geomagnetic sensor, when the motion corresponds to any one of the first motion pattern and the second motion pattern (e.g., operation 1003 of FIG. 10), comparing the accuracy of the geomagnetic sensor with a preset threshold value (e.g., operation 1004 of FIG. 10), and storing current information of the geomagnetic sensor and ending the driving of the geomagnetic sensor, when the accuracy of the geomagnetic sensor is greater than or equal to the threshold value (e.g., operation 1005 and operation 1013 of FIG. 10). The geomagnetic data may be acquired when the accuracy of the geomagnetic sensor is less than the threshold value (e.g., operations 1007 and 1010 of FIG. 10).

According to an embodiment, the first motion pattern may be a motion pattern that is determined by the acceleration sensor to be a walking state, and the second motion pattern may be a motion pattern that is determined by the acceleration sensor to be lifting the electronic device.

As described above, according to an embodiment, an electronic device (e.g., the electronic device 101 of FIG. 2 and the electronic device 300 of FIG. 3) may include an acceleration sensor for outputting acceleration data about motion of the electronic device, a geomagnetic sensor for outputting geomagnetic data about a magnetic field around the electronic device, and a low-power processor electrically connected to the acceleration sensor and the geomagnetic sensor. The low-power processor (e.g., the low-power processor 330 of FIG. 3) may be configured to determine whether the motion of the electronic device corresponds to one of a predetermined first motion pattern and a predetermined second motion pattern, based on acceleration data acquired by the acceleration sensor; compare the accuracy of the geomagnetic sensor with a preset threshold value by driving the geomagnetic sensor, when the motion corresponds to one of the first motion pattern and the second motion pattern; acquire geomagnetic data from the geomagnetic sensor when the accuracy of the geomagnetic sensor is less than the threshold value; and calibrate the geomagnetic sensor, based on the geomagnetic data. When the motion corresponds to the first motion pattern, the geomagnetic data is first geomagnetic data acquired at a first sample rate, and when the motion corresponds to the second motion pattern, the geomagnetic data is first geomagnetic data acquired at a second sample rate higher than the first sample rate.

According to an embodiment, the low-power processor (e.g., the low-power processor 330 of FIG. 3) may be configured to determine an amount of rotation of the motion during a predefined unit time; based on the acquired acceleration data; determine the momentum of the motion, based on the acquired acceleration data; and determine whether the motion corresponds to one of the first motion pattern and the second motion pattern, based on at least one of the amount of rotation during the unit time and a magnitude of the momentum.

According to an embodiment, the low-power processor (e.g., the low-power processor 330 of FIG. 3) may be configured to determine whether the motion corresponds to any one of the first motion pattern and the second motion pattern based further on information acquired by a pedometer of the electronic device.

According to an embodiment, when the calibration of the geomagnetic sensor is completed, the low-power processor (e.g., the low-power processor 330 of FIG. 3) may be configured to store calibrated information of the geomagnetic sensor and end the driving of the geomagnetic sensor.

According to an embodiment, when the accuracy of the geomagnetic sensor is greater than or equal to the threshold value, the low-power processor (e.g., the low-power processor 330 of FIG. 3) may be configured to store current information of the geomagnetic sensor and end the driving of the geomagnetic sensor.

What is claimed is:

1. An electronic device comprising:
   a gyro sensor;
   an acceleration sensor for outputting acceleration data about motion of the electronic device;
   a geomagnetic sensor for outputting geomagnetic data about a magnetic field around the electronic device; and
   a low-power processor electrically connected to the gyro sensor, the acceleration sensor and the geomagnetic sensor,
   wherein the low-power processor is configured to:
      operate the acceleration sensor while the gyro sensor is inactivated;
      determine whether the motion of the electronic device corresponds to one of a predetermined first motion pattern and a predetermined second motion pattern, based on the acceleration data acquired by the acceleration sensor;
      drive the geomagnetic sensor to thereby acquire the geomagnetic data, wherein, when the motion corresponds to the first motion pattern, the geomagnetic data is first geomagnetic data acquired at a first sample rate, and, when the motion corresponds to the second motion pattern, the geomagnetic data is second geomagnetic data acquired at a second sample rate higher than the first sample rate; and
      calibrate the geomagnetic sensor, based on the geomagnetic data.

2. The electronic device of claim 1, wherein the low-power processor is configured to:
   determine an amount of rotation of the motion during a predefined unit time, based on the acquired acceleration data;
   when the amount of rotation during the unit time corresponds to a first range, determine the motion to be the first motion pattern; and
   when the amount of rotation during the unit time corresponds to a second range having a greater value than the first range, determine the motion to be the second motion pattern.

3. The electronic device of claim 2, wherein the low-power processor is configured to determine whether the motion corresponds to one of the first motion pattern and the second motion pattern based further on information acquired by a pedometer of the electronic device.

4. The electronic device of claim 1, wherein, when the calibration of the geomagnetic sensor is completed, the low-power processor is configured to store calibrated information of the geomagnetic sensor and ends the driving of the geomagnetic sensor.

5. The electronic device of claim 4, wherein the low-power processor is configured to:
   receive a request for information on the geomagnetic sensor from an application processor of the electronic device; and
   in response to the request, provide the calibrated information to the application processor.

6. The electronic device of claim 1, wherein the low-power processor is configured to:
   drive the geomagnetic sensor when the motion corresponds to one of the first motion pattern and the second motion pattern;
   compare an accuracy of the geomagnetic sensor with a preset threshold value;
   when the accuracy of the geomagnetic sensor is less than the threshold value, acquire the geomagnetic data; and
   when the accuracy of the geomagnetic sensor is greater than or equal to the threshold value, store current information of the geomagnetic sensor and end the driving of the geomagnetic sensor.

7. The electronic device of claim 1, wherein the first motion pattern is a motion pattern that is determined by the acceleration sensor to be a walking state, and
   the second motion pattern is a motion pattern that is determined by the acceleration sensor to be lifting the electronic device.

8. The electronic device of claim 1, wherein the low-power processor is configured to:
   in response to occurrence of a predefined event associated with the second motion pattern, drive the geomagnetic sensor to thereby acquire the second geomagnetic data at the second sample rate.

9. A method for calibrating a geomagnetic sensor of an electronic device, the method comprising:
   operating an acceleration sensor of the electronic device while a gyro sensor of the electronic device is inactivated;
   determining whether motion of the electronic device corresponds to one of a predetermined first motion pattern and a predetermined second motion pattern, based on acceleration data acquired by the acceleration sensor;

driving the geomagnetic sensor to thereby acquire geomagnetic data, wherein, when the motion corresponds to the first motion pattern, the geomagnetic data is first geomagnetic data acquired at a first sample rate, and, when the motion corresponds to the second motion pattern, the geomagnetic data is second geomagnetic data acquired at a second sample rate higher than the first sample rate; and calibrating the geomagnetic sensor, based on the geomagnetic data.

10. The method of claim 9, wherein the determining of whether the motion corresponds to one of the first motion pattern and the second motion pattern comprises:

determining an amount of rotation of the motion during a predefined unit time, based on the acquired acceleration data;

determining the motion to be the first motion pattern, when the amount of rotation during the unit time corresponds to a first range; and determining the motion to be the second motion pattern, when the amount of rotation during the unit time corresponds to a second range having a greater value than the first range.

11. The method of claim 10, wherein the determining of whether the motion corresponds to one of the first motion pattern and the second motion pattern is based further on information acquired by a pedometer of the electronic device.

12. The method of claim 9, further comprising:

receiving a request for information on the geomagnetic sensor from an application processor of the electronic device; and in response to the request, provided calibrated information to the application processor.

13. The method of claim 9, further comprising:

driving the geomagnetic sensor, when the motion corresponds to one of the first motion pattern and the second motion pattern;

comparing an accuracy of the geomagnetic sensor with a preset threshold value; and storing current information of the geomagnetic sensor and ending the driving of the geomagnetic sensor, when the accuracy of the geomagnetic sensor is greater than or equal to the threshold value, wherein the geomagnetic data is acquired when the accuracy of the geomagnetic sensor is less than the threshold value.

14. The method of claim 9, wherein the first motion pattern is a motion pattern that is determined by the acceleration sensor to be a walking state, and the second motion pattern is a motion pattern that is determined by the acceleration sensor to be lifting the electronic device.

15. An electronic device comprising:

an acceleration sensor for outputting acceleration data about motion of the electronic device;

a geomagnetic sensor for outputting geomagnetic data about a magnetic field around the electronic device; and a low-power processor electrically connected to the acceleration sensor and the geomagnetic sensor, wherein the low-power processor is configured to:

determine whether the motion of the electronic device corresponds to one of a predetermined first motion pattern and a predetermined second motion pattern, based on the acceleration data acquired by the acceleration sensor;

compare an accuracy of the geomagnetic sensor with a preset threshold value by driving the geomagnetic sensor, when the motion corresponds to one of the first motion pattern and the second motion pattern;

acquire the geomagnetic data from the geomagnetic sensor when the accuracy of the geomagnetic sensor is less than the threshold value, wherein, when the motion corresponds to the first motion pattern, the geomagnetic data is first geomagnetic data acquired at a first sample rate, and, when the motion corresponds to the second motion pattern, the geomagnetic data is second geomagnetic data acquired at a second sample rate higher than the first sample rate; and calibrate the geomagnetic sensor, based on the geomagnetic data.

* * * * *